(12) United States Patent
Savoj et al.

(10) Patent No.: US 7,949,078 B1
(45) Date of Patent: *May 24, 2011

(54) HIGH-PRECISION SIGNAL DETECTION FOR HIGH-SPEED RECEIVER

(75) Inventors: Jafar Savoj, Sunnyvale, CA (US); Pierte Roo, Sunnyvale, VA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/621,703

(22) Filed: Nov. 19, 2009

Related U.S. Application Data

(63) Continuation of application No. 10/961,004, filed on Oct. 7, 2004, now Pat. No. 7,643,583.

(60) Provisional application No. 60/599,724, filed on Aug. 6, 2004.

(51) Int. Cl.
*H04L 27/06* (2006.01)

(52) U.S. Cl. ........ 375/340; 375/316; 375/318; 375/302; 375/342; 375/344; 375/350; 348/449

(58) Field of Classification Search ............... 375/316, 375/318, 302, 340, 342, 344, 350; 369/59.19; 348/449
See application file for complete search history.

(56) References Cited

U.S. PATENT DOCUMENTS

| | | | |
|---|---|---|---|
| 3,840,821 | A | 10/1974 | Conway |
| 4,695,808 | A | 9/1987 | Cabaniss et al. |
| 5,291,505 | A | 3/1994 | Nielsen |
| 5,483,617 | A | 1/1996 | Patterson et al. |
| 5,684,458 | A | 11/1997 | Calvarese |
| 5,781,549 | A | 7/1998 | Dai |
| 6,336,001 | B1 | 1/2002 | Kawamura et al. |
| 7,099,463 | B1 | 8/2006 | Karam |
| 7,280,450 | B2 | 10/2007 | Büchler |
| 7,643,583 | B1 * | 1/2010 | Savoj et al. ............ 375/340 |
| 2002/0114249 | A1 | 8/2002 | Kato et al. |
| 2003/0038640 | A1 | 2/2003 | Zuercher et al. |
| 2004/0039552 | A1 | 2/2004 | Moll et al. |
| 2004/0203559 | A1 | 10/2004 | Stojanovic et al. |
| 2005/0122145 | A1 | 6/2005 | Ido et al. |

OTHER PUBLICATIONS

IEEE Std. 802.3™-2002, The Institute of Electrical and Electronics Engineers, Inc., New York, 2002.
IEEE Std. 802.3an™-2006, The Institute of Electrical and Electronics Engineers, Inc., New York, 2006.

* cited by examiner

*Primary Examiner* — Chieh M Fan
*Assistant Examiner* — Siu M Lee

(57) ABSTRACT

In a high-precision signal detection apparatus and method for a high-speed receiver, signal detection occurs asynchronously of the incoming data. A comparison clock is generated by an oscillator whose effective capacitance is varied by a second, lower speed oscillator connected to the capacitance. This prevents the asynchronous sampling that occurs in a zero-crossing position in the incoming data from remaining in that position in subsequent sampling cycles, so that a valid signal is not missed by the detector.

20 Claims, 7 Drawing Sheets

HIGH-PRECISION SIGNAL DETECTION FOR HIGH-SPEED RECEIVER

CROSS REFERENCE TO RELATED APPLICATION

This is a continuation of commonly-assigned U.S. patent application Ser. No. 10/961,004, filed Oct. 7, 2004, now U.S. Pat. No. 7,643,583, which claims the benefit of commonly-assigned U.S. Provisional Patent Application No. 60/599,724, filed Aug. 6, 2004, each of which is hereby incorporated herein by reference in its respective entirety.

BACKGROUND OF THE INVENTION

This invention relates to a signal detector circuit for a high-speed receiver. More particularly, this invention relates to a signal detector circuit that operates asynchronously of the received data and at a lower frequency, but nevertheless detects with high-precision the presence of incoming data.

High-speed receivers, such as are used in 10 Mbps (i.e., 10BASE-T) and 100 Mbps (i.e., 100BASE-T) Ethernet applications compliant with the IEEE 802.3 standard, gigabit Ethernet (i.e., 1000BASE-T) applications (IEEE 802.3ab), and 10 Gigabit Ethernet (i.e., 10 GBASE-T) applications (IEEE 802.3an), are frequently idle, insofar as there may not be incoming data to process. (All references herein, including in the claims that follow, to any IEEE standard, is a reference to the version of that standard current on the filing date hereof.) It therefore would be desirable to be able to turn off such a receiver—e.g., to conserve power—until such time as incoming data are present. However, if the receiver were turned off, it would be desirable to be able to reliably turn on the receiver when data begin to arrive.

SUMMARY OF THE INVENTION

In accordance with this invention, a signal detector for detecting the presence of incoming data is provided. The signal detector according to the invention may be used as a trigger to activate, on the arrival of incoming data, a receiver that in the absence of data has been turned off, or placed in a low-power mode. Although the frequency of the incoming data may be high, such as in the gigabit Ethernet example above, it is desirable for the signal detector to operate at low power as part of the low-power mode of the receiver. Therefore, in accordance with the invention, the signal detector preferably operates at a lower clock speed than the incoming data to conserve power, and also preferably operates asynchronously of the incoming data to avoid the need to perform clock recovery operations on the incoming data. This allows the clock recovery portion of the receiver to remain in the low-power mode, along with most of the receiver, to maximize power savings. Essentially the only portions of the receiver that need to remain powered up preferably are the signal detector of the present invention, and a bias current generator.

The signal detector preferably compares an incoming signal to a preferably precisely-generated reference voltage and preferably generates a pulse when the incoming signal has an amplitude exceeding the reference voltage. Preferably, the detector is triggered whether the incoming signal is positive or negative, as long as its absolute value exceeds the reference voltage. If the incoming signal is a differential signal, as is the case in many high-speed signal protocols (e.g., Low-Voltage Differential Signaling, or LVDS, is one such protocol), then preferably the common mode of the reference signal is matched as closely as possible to the common mode of the differential input signal. The comparison of the input signal preferably is achieved by subtracting the input signal from the threshold value, and preferably also, in case the input signal is negative, by subtracting the inverse of the input signal from the threshold value.

Those differences preferably are sampled at a sampling frequency, generated in the signal detector, that is lower than, and asynchronous to, the data frequency. However, if the sampling frequency, as generated locally, turns out, by chance, to be an integer fraction of the data frequency, and if, also by chance, the first sample is at or near a zero crossing of the data signal, so that it does not exceed the threshold, then each subsequent sample also will be at or near a zero crossing, and the signal detector may fail to recognize a valid incoming data signal.

Therefore, the clock generator according to the present invention preferably varies its frequency slowly between a minimum sampling frequency and a maximum sampling frequency. This is achieved, in one preferred embodiment, by providing a first oscillator, such as a ring oscillator, to generate the local clock. Each stage of the ring oscillator preferably includes a resistance and a capacitance that determine the local oscillator frequency. Each capacitance preferably includes a first capacitor between the resistance and ground, and a second capacitor between the resistance and a second, slower oscillator circuit (which may, e.g., be another ring oscillator). As the second, slower oscillator oscillates, it varies the voltage at its end of the second capacitor, which varies the contribution of the second capacitor to the overall capacitance, thereby varying the frequency of the first oscillator and the frequency of the local clock. As the local clock varies, even if on some local clock cycles the sampling time occurs at or near a zero crossing in the incoming signal, the sampling time will move out of that region of the incoming data signal on a subsequent local clock cycle and so will detect the incoming data signal after at most a short delay.

The outputs of both samplers—i.e., the sampler monitoring the excess of the signal over the threshold and the sampler monitoring the excess of the inverted signal over the threshold—preferably are input to an OR-gate, so that the presence of a signal results in the output by the OR-gate of a logic "1" regardless of the polarity of the signal.

If the OR-gate outputs a logic "1", meaning that a signal has been detected, then without more that signal will remain only high for one cycle of the local clock generator. That interval may be insufficient for activating the remainder of the receiver. Therefore, in accordance with the invention the output pulse preferably is stretched.

Thus, in accordance with the present invention there is provided a method of detecting a received signal having a signal amplitude and a signal frequency. The method includes comparing the signal amplitude to a threshold to generate a comparison signal that has having a first amplitude when the signal amplitude exceeds the threshold and a second amplitude when the signal amplitude fails to exceed the threshold. A sampling clock is generated having a sampling frequency that varies between a minimum sampling frequency and a maximum sampling frequency. The comparison signal is sampled at intervals determined by the sampling frequency. A detection signal is outputted when the sampled comparison signal has the first amplitude. Variation of the sampling frequency prevents detection failures resulting from repeated sampling of a signal in a region thereof wherein the signal amplitude fails to exceed the threshold.

A system operating in accordance with the method is also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention will now be described with reference to FIGS. 1-7.

Figure 1:
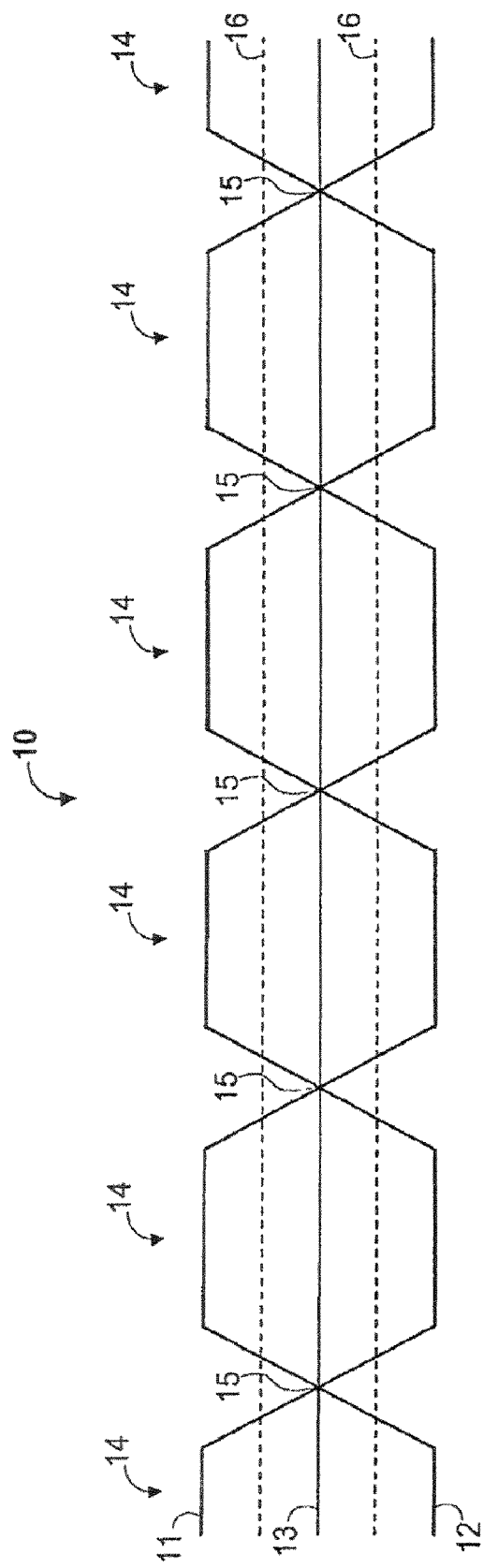
FIG. 1 is a schematic representation of a data signal to be detected by a detector in accordance with the invention.

FIG. 1 shows a generic digital signal 10 of a type with which the present invention may be used. As is conventional, signal 10 is represented by two traces 11, 12 which alternatively may represent either the signal pair of a differential signal as described above, or, for a single-ended signal, the fact that any particular pulse may be positive-going or negative-going. Level 13 represents the common mode of signal 10, which may or may not be 0 volts.

As seen in FIG. 1, signal 10 includes a number of periods 14 in which pulses may occur, based on the signal frequency, $f_0$, separated by zero-crossings 15. The periods 14 are sometimes referred to as "data eyes" because of their shape.

Figure 2:
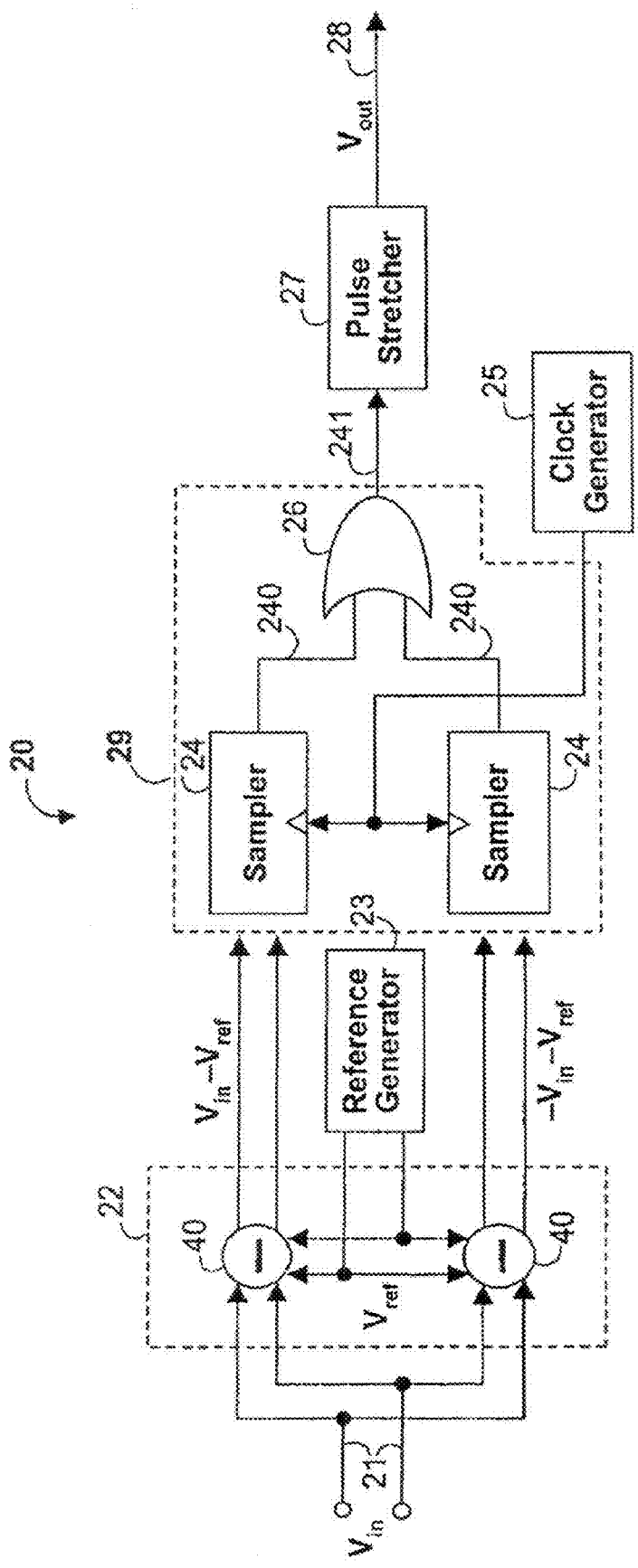
FIG. 2 is a schematic diagram of a preferred embodiment of a signal detector in accordance with the invention.

A preferred embodiment of a signal detector 20 in accordance with the present invention is shown in FIG. 2. As discussed above, signal detector 20 preferably is part of a larger receiver circuit (not shown) which, for power conservation purposes, is mostly shut down during periods when no incoming signal is present. Such a receiver must be able to react quickly when a signal arrives, but if it reacts too indiscriminately, turning on when there is in fact no incoming signal, the power savings may be reduced. Therefore, it is desirable to be able to quickly and accurately detect an incoming signal so that the receiver can be turned on at the appropriate time. Signal detector 20 is designed to perform that function.

In the case of a differential digital signal 10 as shown in FIG. 1, except in the vicinity of zero-crossings 15, the signal will be both +1 and −1. The actual voltage will depend on the particular signaling scheme in use (e.g., 5 volts for older schemes, or 3.3 volts or less for newer schemes). For an analog signal, the value between zero-crossings will vary regularly between 0 and +1 or between 0 and −1. In any case, the best way to determine if a signal is present is to detect a voltage with a sufficient absolute value to give confidence that it is not noise, such as threshold value 16.

In the case of an analog signal (e.g., a sine wave), the sampling point might have to be somewhat farther from a zero-crossing 15 to exceed threshold 16. Thus, it is desirable that sampling not occur too close to a zero-crossing 15. Otherwise, even in the presence of a valid signal, the detector will "think" that no signal is present.

As set forth above, signal detector 20 preferably operates asynchronously of the incoming data, and at a slower frequency, to conserve power, and because any clock recovery circuitry in the receiver preferably is powered down along with most of the remainder of the receiver, so that synchronous operation is not even possible. Thus, it is possible that by chance, even if a valid signal is present, sampling will occur in the vicinity of a zero-crossing 15. And if the sampling frequency, again by chance, is an integer fraction, $f_0/n$, of the data frequency $f_0$, subsequent samples will continue to occur in the vicinity of a zero-crossing 15, and the signal will not be detected. Even if the sampling frequency is different from, but nevertheless close to, $f_0/n$, it may be many cycles before the sampling point moves far enough from a zero-crossing 15, resulting in unacceptable delay in detecting the signal, even though ultimately it will be detected.

In accordance with the present invention, as discussed in more detail below, the sampling frequency is varied so that even if a sample occurs in the vicinity of a zero-crossing 15, on a subsequent cycle the sampling point will have moved sufficiently far from zero-crossing 15 that the signal can be detected.

Signal detector 20 as shown in FIG. 2 is designed for a differential signal, but it will be recognized that signal detector 20 can be used essentially without modification with a single-ended signal (digital or even analog) by grounding one of the two input leads 21. Alternatively, the second signal path can be omitted if the signal detector is designed specifically for a single-ended application.

Figure 3:
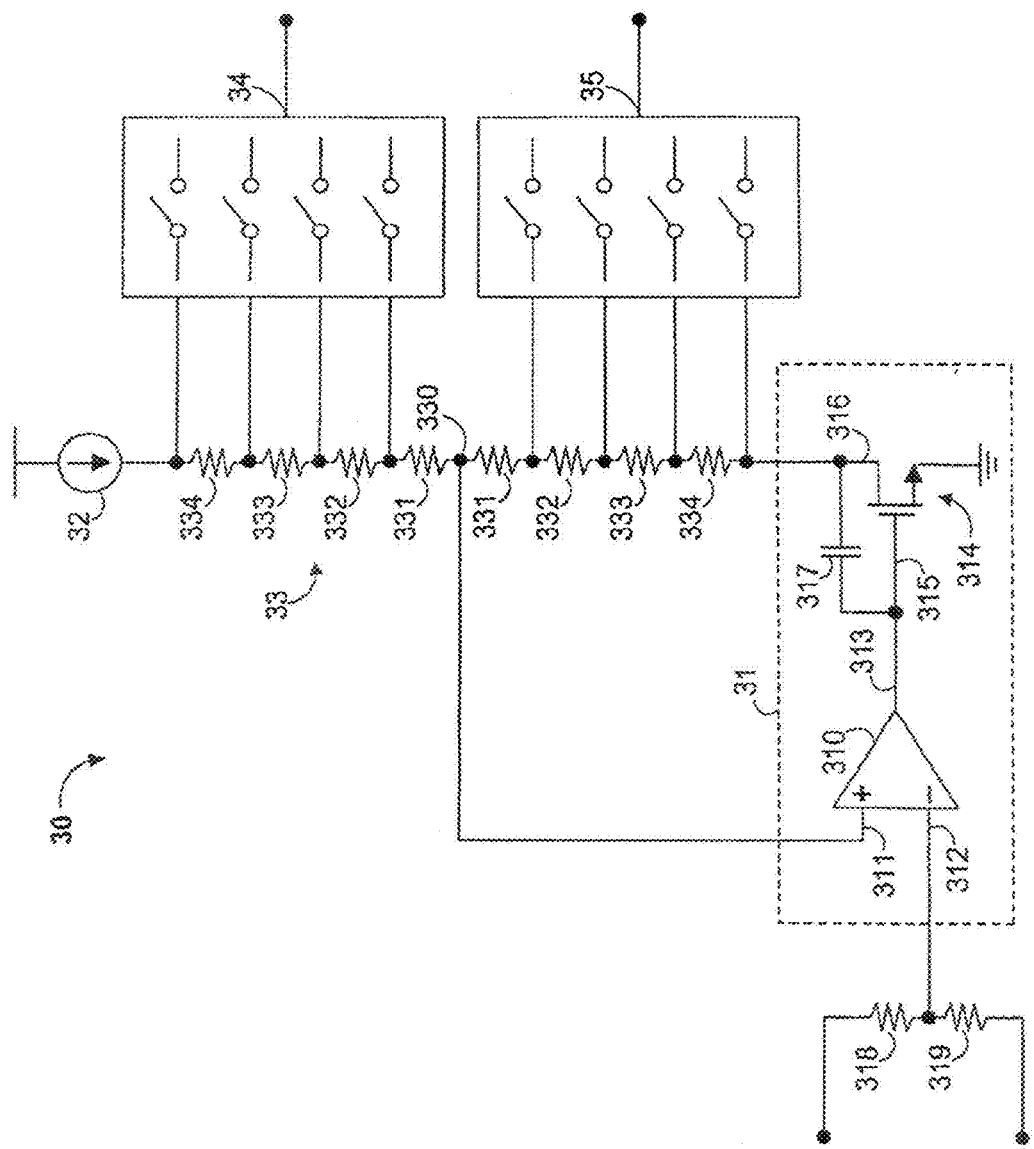
FIG. 3 is a schematic diagram of a preferred embodiment of a reference generator for use in the signal detector of FIG. 2.
Figure 4:
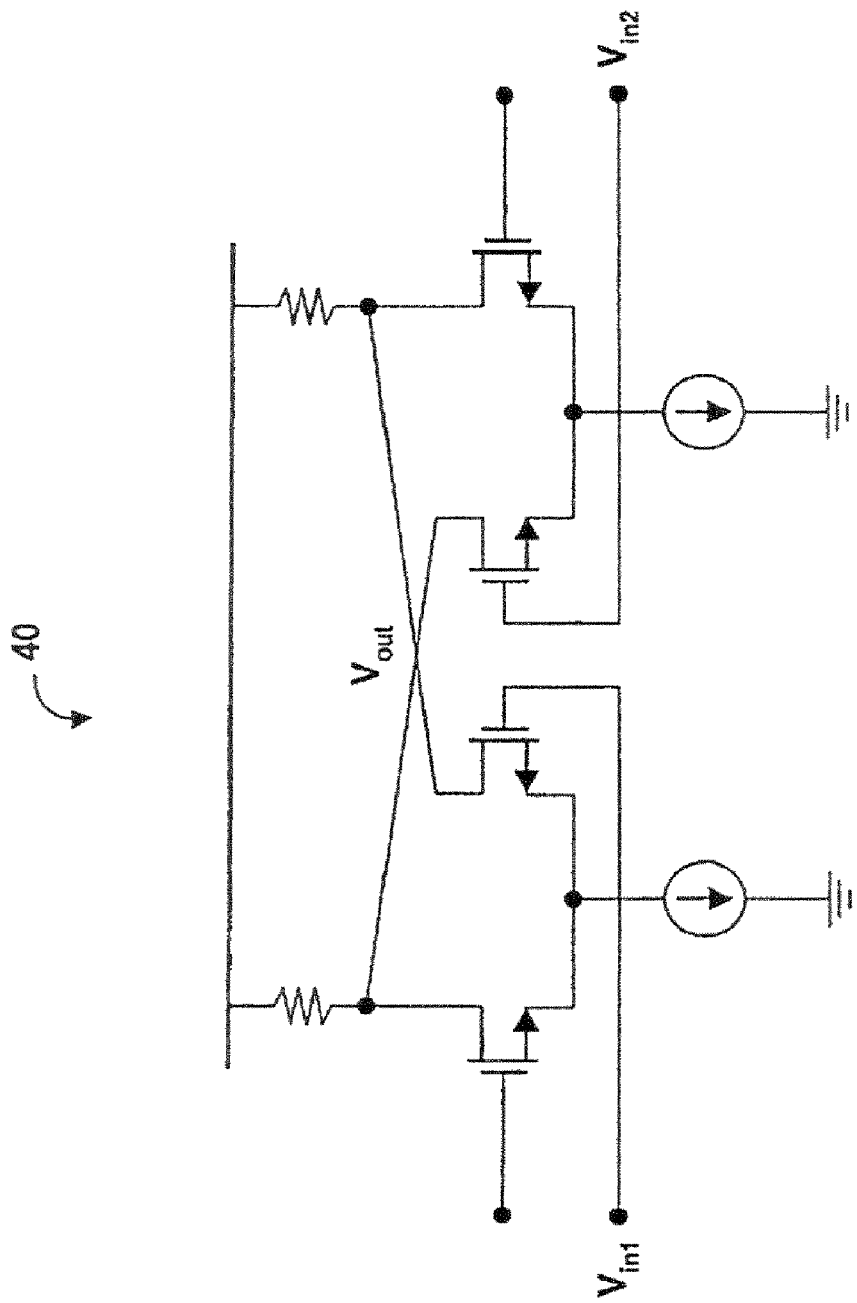
FIG. 4 is a schematic diagram of a preferred embodiment of a subtractor for use in the signal detector of FIG. 2.

Signal 10, input at 21, is compared at comparison signal generator circuitry 22 to a reference voltage generated by reference voltage generator 23. It is preferable that in the case of a differential signal 10, the reference voltage have a common mode identical or nearly identical to the common mode of signal 10, so that an accurate difference is compared to the threshold level. A preferred embodiment 30 of a reference voltage generator capable of generating a reference signal with the appropriate common mode value is shown in FIG. 3.

Reference voltage generator 30 preferably includes a two-stage amplifier 31, a constant current source 32 and resistor ladder 33 connected between constant current source 32 and the output of two-stage amplifier 31. It is preferable that all resistors in resistor ladder 33 have the same resistance value, but it is only necessary the members of each pair of resistors about midpoint 330 have identical values. Thus, both resistors 331 preferably have the same value, both resistors 332 preferably have the same value, both resistors 333 preferably have the same value, and both resistors 334 preferably have the same value. For a differential reference voltage, the "upper" and "lower" components preferably are tapped from a pair of taps 34, 35 symmetrical about midpoint 330.

Two-stage amplifier 31 preferably includes a first amplifier stage 310 having two inputs 311, 312, and an output 313, and a second amplifier stage 314 having one input 315 which is connected to first-stage output 313, and having a second-stage output 316. A floating compensation capacitor 317 is connected between second-stage output 316 and second-stage input 315 to prevent oscillation in reference voltage generator 30.

One input 311 of first amplifier stage 310 preferably is connected to midpoint 330, while the other input 312 of first amplifier stage 310 preferably is connected to upper and lower components of the input voltage at 21 by respective resistors 318, 319 having identical, relatively large resistance values (e.g., 20 kΩ. This arrangement keeps midpoint 330, which one can see is the common mode of the reference voltage at 34, 35, substantially equal to the common mode of the voltage input at 21. However, any arrangement that provides the desired common mode may be used.

Comparison signal generator circuitry 22 compares the input voltage at 21 to the reference voltage at 34, 35. Preferably, both the input voltage and the inverse of the input voltage are compared to the reference voltage so that effectively the absolute value of the input voltage is being compared to the reference voltage. That way, even if the input voltage is negative-going at the sampling point, if its magnitude exceeds the threshold, the signal is detected. Preferably the comparison is a simple subtraction of the reference voltage from the input voltage and from its inverse. A preferred embodiment of a suitable subtractor 40, using two differential pairs that subtract currents at their common drains. Two subtractors 40 are used in comparison signal generator circuitry 22, as seen in FIG. 2, one each for the positive and inverted subtractions.

It will be apparent that for a single-ended signal (including an analog signal), input 312 of first amplifier stage 310 can be grounded so that the common mode of reference voltage generator 30 becomes ground, and the reference voltage output can be taken from a desired one of taps 34 only. In such a single-ended case, the subtractor preferably would be a single differential pair, with the signal connected to one side and the difference output from the other side.

The comparison signals generated by circuitry 22 are input to a comparator 29. Preferably, comparator 29 includes two samplers 24, and summer or OR-gate 26. Samplers 24, when activated on each cycle of sampling clock generator 25, test whether the signal from either subtractor 40 is non-zero. If so, the corresponding one of samplers 24 outputs a logic "1" signal. The two sampler outputs 240 are summed or ORed by summer or OR-gate 26, so that if either output 240 is high, detector 20 outputs a high signal 241. Summer or OR-gate 26 may also serve as a preamplifier for the output signal.

Although comparator 29 is shown as including samplers 24 and summer or OR-gate 26, any suitable comparator may be used. A different comparator, for example, may not share the common mode requirements of the embodiment described. However, such a comparator preferably would still sample the comparison signals at intervals determined by sampling clock generator 25.

Figure 5:
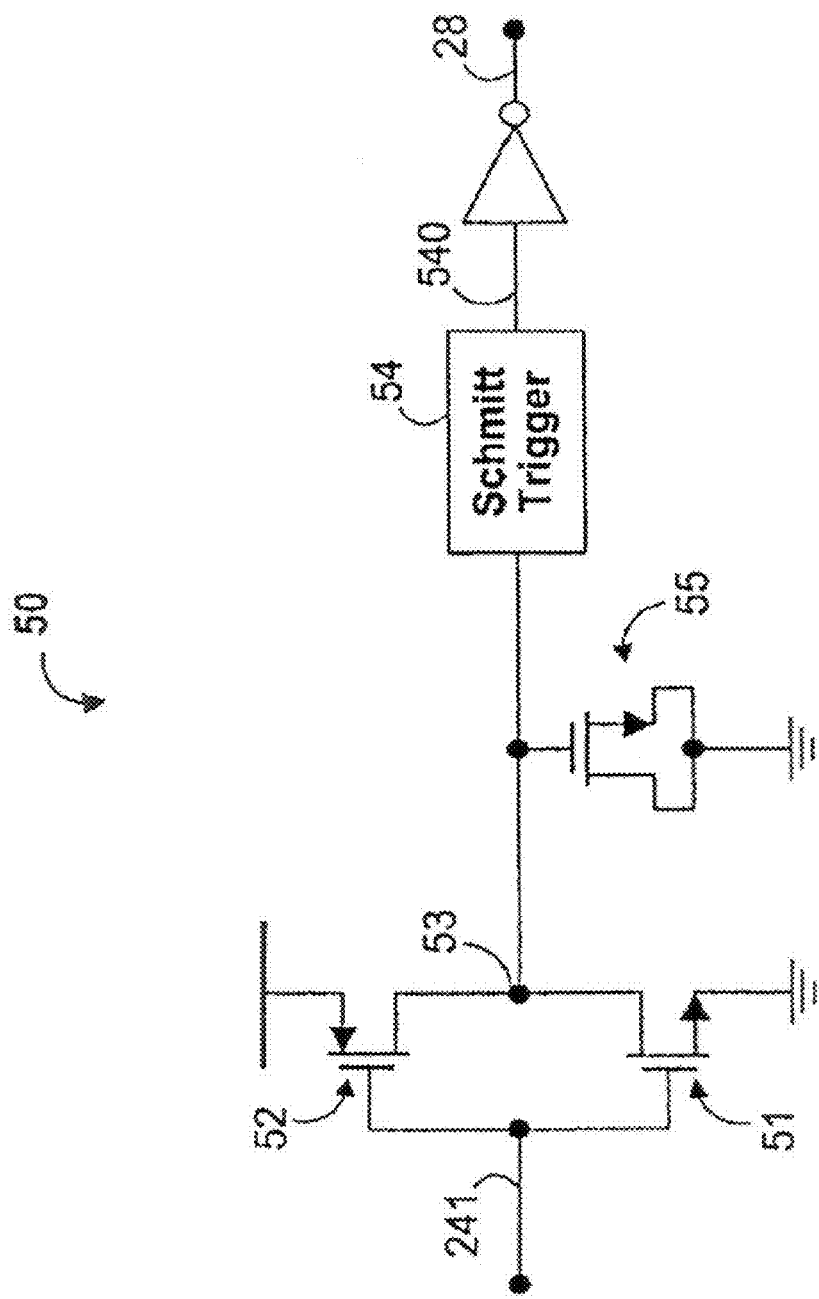
FIG. 5 is a schematic diagram of a preferred embodiment of pulse stretcher for use in the signal detector of FIG. 2.

It is desirable that signal 241 be high long enough to activate the remainder of the receiver. A suitable duration might be twice the period of the clock used in the logic circuit involved—e.g., in the case of a receiver (not shown) having a physical coding sublayer (PCS) sampling clock of 40 ns, signal 241 preferably should be high for 80 ns. To achieve that result, pulse stretcher 27 preferably elongates the duration of signal 241. One preferred embodiment 50 of pulse stretcher 27 is shown in FIG. 5.

In pulse stretcher 50, signal 241 preferably is input to both a strong NMOS transistor 51 and a weak PMOS transistor 52, having a shared output 53 connected both to Schmitt trigger 54 and to ground through capacitor 55. If signal 241 goes high, strong NMOS transistor 51 will quickly discharge capacitor 55, causing Schmitt trigger 54 to hold a zero output 540 which is inverted by inverter 56 to produce a high on signal detect output 28, which will remain until capacitor 55 can be recharged to change the state of Schmitt trigger 54. However, when signal 241 goes low, it will have to remain low for many clock cycles before weak PMOS transistor 52 can recharge capacitor 55. During all that time, Schmitt trigger output 540, and therefore signal detect output 28, will remain unchanged. Thus, output 28 quickly reflects a signal detection, but does not return to a low state for several clock cycles, to allow sufficient time for the remainder of the receiver to be turned on. Preferably, that function is performed by the PCS of the receiver (not shown).

Figure 6:
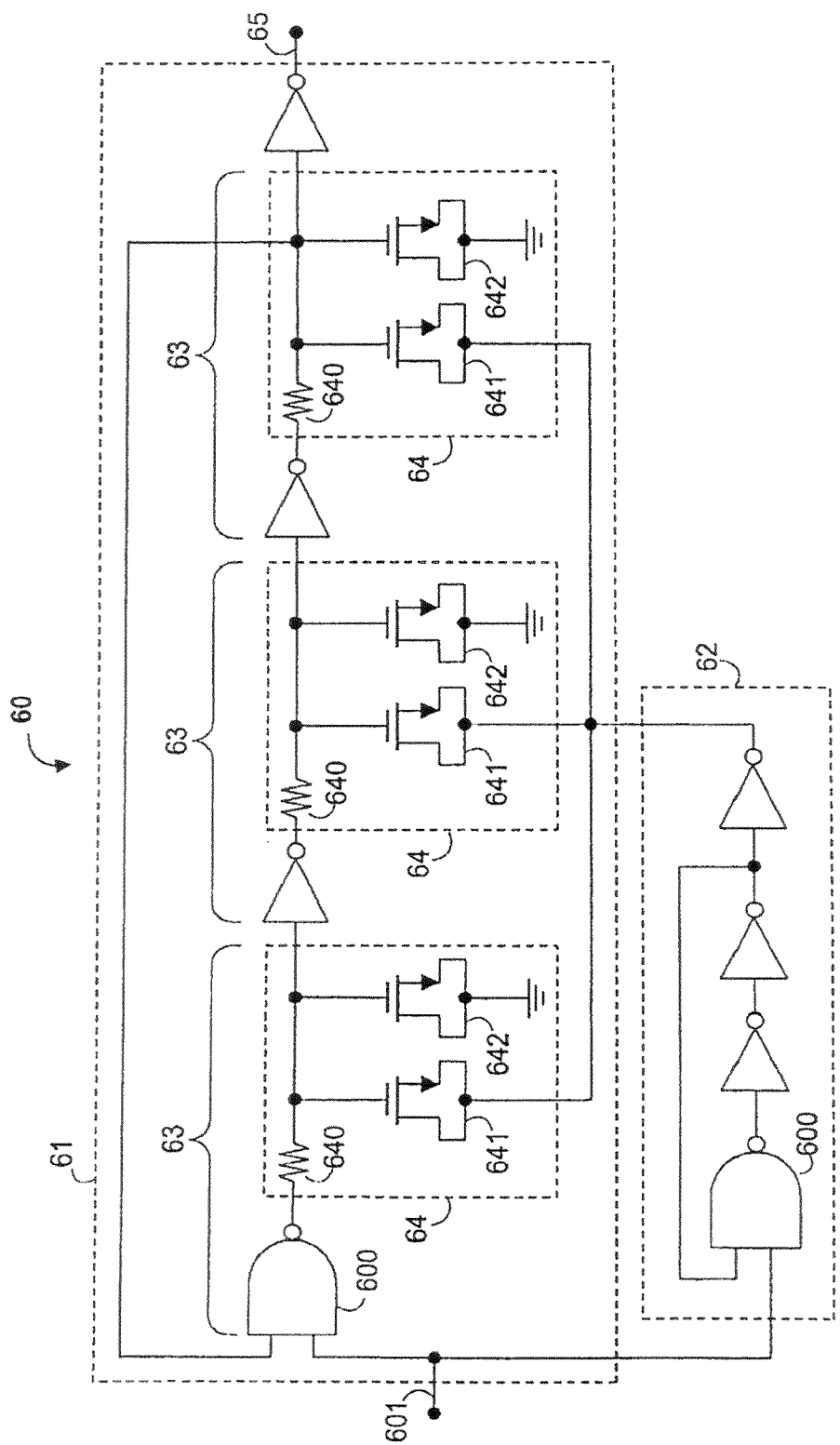
FIG. 6 is a schematic diagram of a preferred embodiment of a clock generator for use in the signal detector of FIG. 2.
Figure 7:
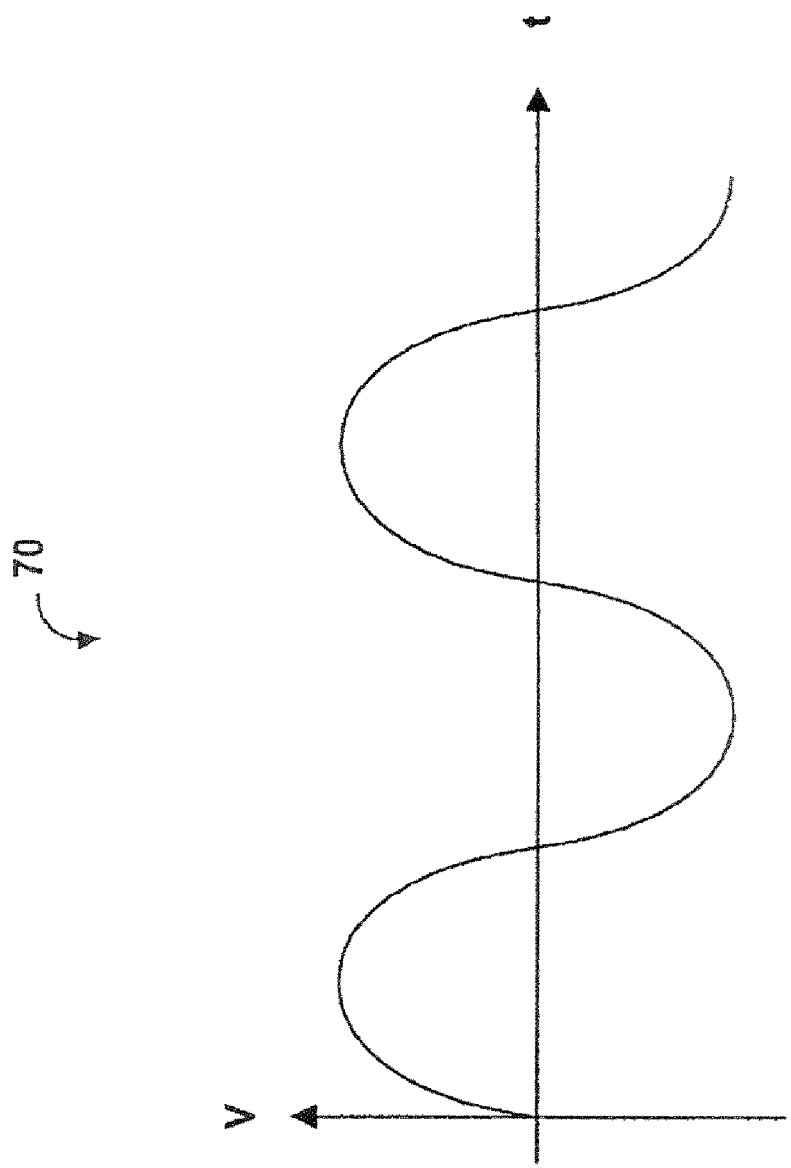
FIG. 7 is a graph of the output of a low-speed oscillator within the clock generator of FIG. 6.

A preferred embodiment 60 of a sampling clock generator 25 is shown in FIG. 6. Sampling clock generator 25 preferably includes a main oscillator 61 and a low-speed oscillator 62. Preferably, both oscillators 61, 62 are three-stage ring oscillators. Each ring oscillator 61, 62 preferably includes a NAND-gate 600 in its respective ring which can be used to turn off clock generator 25 by applying a "0" at input 601 to force a "1" output from each NAND-gate 600 and thereby stop each oscillator 61, 62 from oscillating.

Each stage 63 of ring oscillator 61 includes an RC circuit 64 that governs the frequency of output 65. RC circuit 64 preferably includes a resistor or other resistance 40 and two capacitors 641, 642. Each capacitor 642 preferably is connected between resistor 640 and ground, while each capacitor 641 preferably is connected between resistor 640 and the output of oscillator 62. As the output voltage 70 (see FIG. 7) of oscillator 62 varies, the voltage across each capacitor 641 varies as well, changing its contribution to the total capacitance of its respective RC circuit 64, and therefore changing the frequency of output 65 between a minimum sampling frequency ($f_{min}$) and a maximum sampling frequency ($f_{max}$). For the frequency ($f_{slow}$) of output 70 to ensure that main oscillator output 65 spends enough time at $f_{min}$ or $f_{max}$, thus ensuring that the output frequency is sufficiently off from an integer fraction of $f_0$, $f_{slow}$ preferably is less than half the difference between $f_{max}$ and $f_{min}$.

Thus, it can be seen that local clock generator 25 generates a sampling clock that varies in frequency, so that the sampling point will not remain in the vicinity of a zero-crossing 15 for more than one, or a small number, of clock cycles.

The signal detector of the present invention may be used with any serial data receiver, including those in high-speed fiber channel transceivers for the physical layer of a TCP/IP stack, but also any other high-speed serial interface, whether differential or single-ended, and whether fiber-based or copper- or other metal-based.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of detecting a received signal having a signal amplitude and a signal frequency, said method comprising:
comparing said signal amplitude to a threshold to generate a comparison signal, said comparison signal having a first amplitude when said signal amplitude exceeds said threshold and a second amplitude when said signal amplitude fails to exceed said threshold;
generating a sampling clock having a sampling frequency that varies during sampling of said comparison signal;
sampling said comparison signal at intervals determined by said sampling frequency; and
outputting a detection signal when said sampled comparison signal has said first amplitude; wherein:
variation of said sampling frequency prevents detection failures resulting from repeated sampling of said comparison signal in a region thereof wherein said signal amplitude fails to exceed said threshold.

2. The method of claim 1 wherein said generating a sampling clock comprises:
generating a modulating clock signal;
using said modulating clock signal to vary an effective capacitance in an oscillator; and
generating said sampling clock using said oscillator having said varying capacitance.

3. The method of claim 1 wherein:
said comparing comprises subtracting said threshold from said signal amplitude to form a first difference signal; and
said sampling comprises sampling said first difference signal.

4. The method of claim 3 wherein:
said comparing further comprises subtracting said threshold from an inverse of said signal amplitude to form a second difference signal; and
said sampling further comprises:
sampling said second difference signal, and
combining results of said sampling said first difference signal and said sampling said second difference signal.

5. The method of claim 1 further comprising elongating duration of said detection signal.

6. The method of claim 1 further comprising generating said threshold.

7. The method of claim 6 wherein:
said received signal is a differential signal having a received common mode voltage; and
said generating said threshold comprises generating a differential threshold signal having a threshold common mode voltage substantially equal to said received common mode voltage.

8. A signal detector for detecting a received signal having a signal amplitude and a signal frequency, said signal detector comprising:
means for comparing said signal amplitude to a threshold to generate a comparison signal, said comparison signal having a first amplitude when said signal amplitude exceeds said threshold and a second amplitude when said signal amplitude fails to exceed said threshold;
means for generating a sampling clock having a sampling frequency that varies during sampling of said comparison signal;
means for sampling said comparison signal at intervals determined by said sampling frequency; and
means for outputting a detection signal when said sampled comparison signal has said first amplitude; wherein:
variation of said sampling frequency prevents detection failures resulting from repeated sampling of said comparison signal in a region thereof wherein said signal amplitude fails to exceed said threshold.

9. The signal detector of claim 8 wherein:
said means for generating a sampling clock comprises:
means for generating a modulating clock signal, and
oscillator means including an effective capacitance;
output of said means for generating a modulating clock signal is operatively connected to said effective capacitance to modulate said effective capacitance; and
said oscillator means generates said sampling clock.

10. The signal detector of claim 9 wherein:
said oscillator means comprises ring oscillator means having stages, each of said stages including resistance means and capacitance means; and
said capacitance means comprises:
first capacitor means connected between said resistance means and a fixed voltage, and
second capacitor means connected between said resistance means and output of said modulating clock signal generating means; whereby:
variation of said modulating clock signal output varies effective capacitance of said second capacitor means, thereby varying effective capacitance of said capacitance means, thereby varying said sampling clock.

11. A signal detector for detecting a received signal having a signal amplitude and a signal frequency, said signal detector comprising:
a comparison signal generator that compares said signal amplitude to a threshold to generate a comparison signal, said comparison signal having a first amplitude when said signal amplitude exceeds said threshold and a second amplitude when said signal amplitude fails to exceed said threshold;
a sampling clock generator that generates a sampling clock having a sampling frequency that varies during sampling of said comparison signal;
a sampler that samples said comparison signal at intervals determined by said sampling frequency; and
an output circuit that outputs a detection signal when said sampled comparison signal has said first amplitude; wherein:
variation of said sampling frequency prevents detection failures resulting from repeated sampling of said comparison signal in a region thereof wherein said signal amplitude fails to exceed said threshold.

12. The signal detector of claim 11 wherein:
said sampling clock generator comprises:
a modulating clock signal generator, and
an oscillator including an effective capacitance;
output of said modulating clock signal generator is operatively connected to said effective capacitance to modulate said effective capacitance; and
said oscillator generates said sampling clock.

13. The signal detector of claim 12 wherein:
said oscillator comprises a ring oscillator having stages, each of said stages including resistance and capacitance; and
said capacitance comprises:
a first capacitor connected between said resistance and a fixed voltage, and
a second capacitor connected between said resistance and output of said modulating clock signal generator; whereby:
variation of said modulating clock signal output varies effective capacitance of said second capacitor, thereby varying effective capacitance of said capacitance, thereby varying said sampling clock.

14. The signal detector of claim 11 wherein:
said comparison signal generator comprises a first subtractor that subtracts said threshold from said signal amplitude to form a first difference signal; and
said sampler samples said first difference signal.

15. The signal detector of claim 14 wherein:
said comparison signal generator further comprises a second subtractor that subtracts said threshold from an inverse of said signal amplitude to form a second difference signal; and
said sampler also samples said second difference signal, and comprises a combinatorial function that combines results of said sampling said first difference signal and said sampling said second difference signal.

16. The signal detector of claim 11 further comprising a pulse stretcher for elongating duration of said detection signal.

17. The signal detector of claim 11 further comprising a threshold generator for generating said threshold.

18. The signal detector of claim 17 wherein:
said received signal is a differential signal having a received common mode voltage; and
said threshold generator comprises a differential threshold signal generator that generates a threshold signal having a threshold common mode voltage substantially equal to said received common mode voltage.

19. The signal detector of claim 18 wherein said differential threshold signal generator comprises:
   a two-stage amplifier comprising:
      a first amplifier having two inputs and a first amplifier output, and
      a second amplifier having an input connected to said output of said first amplifier and having a second amplifier output;
   a resistor ladder comprising an even number of resistors and taps between said resistors, and having a midpoint; and
   a constant current source; wherein:
   said resistor ladder is connected between said constant current source and said second amplifier output;
   said midpoint is connected to one of said inputs of said first amplifier;
   said received common mode voltage is connected to another of said inputs of said first amplifier; and
   said differential threshold signal is tapped from a pair of said taps symmetrical about said midpoint.

20. The signal detector of claim 19 further comprising:
   a first input resistor connected between one leg of said received differential signal and said another of said inputs of said first amplifier; and
   a second input resistor means connected between another leg of said received differential signal and said another of said inputs of said first amplifier; wherein:
   said first and second input resistors connect said received common mode voltage to said another of said inputs of said first amplifier.

* * * * *

Disclaimer

7,949,078 — Jafar Savoj, Sunnyvale, CA (US); Pierte Roo, Sunnyvale, CA (US). HIGH-PRECISION SIGNAL DETECTION FOR HIGH-SPEED RECEIVER. Patent dated May 24, 2011. Disclaimer filed Nov. 2, 2011, by the assignee MARVELL INTERNATIONAL LTD.

The term of this patent shall not extend beyond the expiration date of Patent No. 7,643,583.

*(Official Gazette, January 31, 2012)*